July 21, 1970   F. SCARFE ET AL   3,520,979
ELECTRODE CIRCUIT FOR HEX ELECTRIC FURNACE
Filed Feb. 26, 1968
FIG.1 PRIOR ART
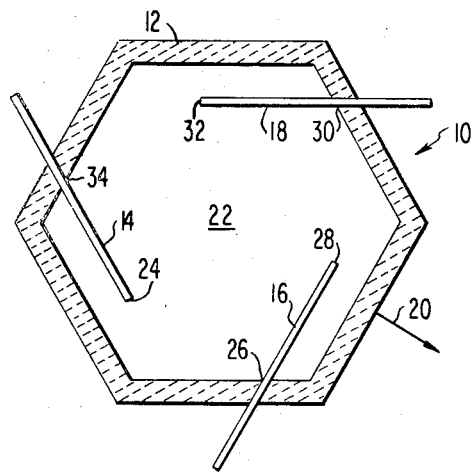
FIG.2 PRIOR ART
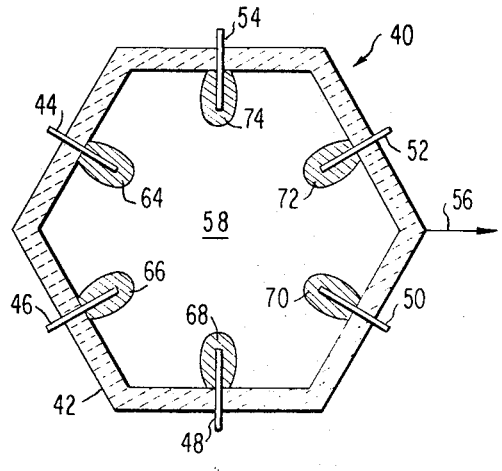
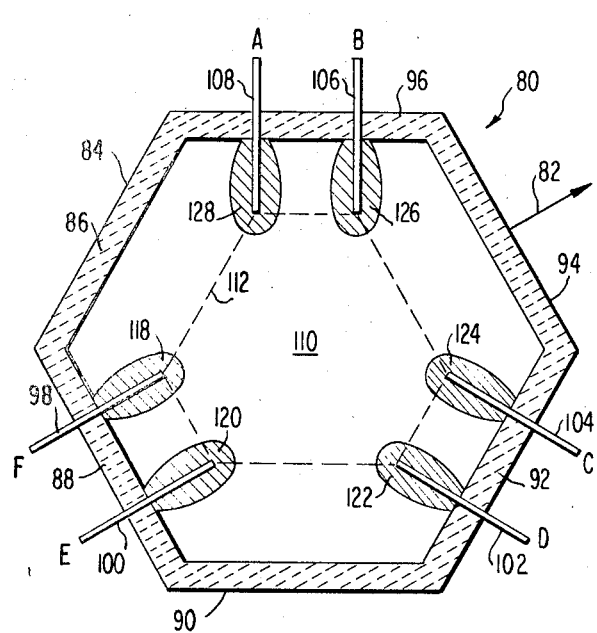
FIG.3
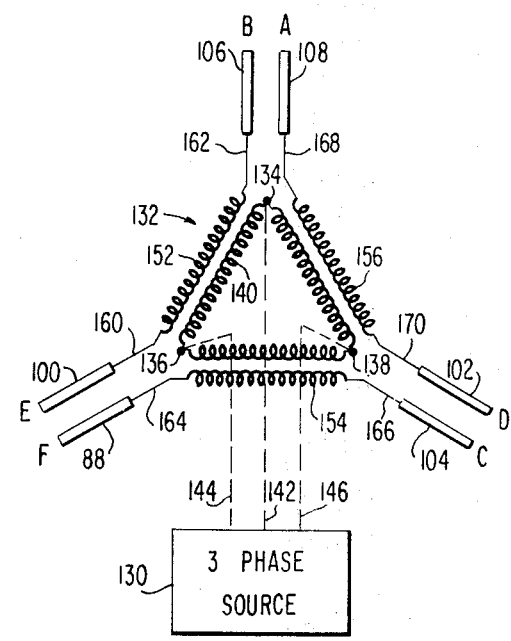
FIG.4
INVENTORS
H. LARRY PENBERTHY
FREDERICK SCARFE
BY  LeBlanc & Shur
ATTORNEYS United States Patent Office 3,520,979
Patented July 21, 1970

3,520,979
ELECTRODE CIRCUIT FOR HEX ELECTRIC FURNACE
Frederick Scarfe, Benfleet, England, and Harvey Larry Penberthy, Seattle, Wash.; said Scarfe assignor to Penelectro Limited, Eastwood Leigh-on-Sea, Essex, England
Filed Feb. 26, 1968, Ser. No. 708,150
Int. Cl. C03b 5/02; H05b 17/06
U.S. Cl. 13—18
11 Claims

ABSTRACT OF THE DISCLOSURE

Disclosed is a heating electrode assembly and power supply connection for glass furnaces which gives more uniform current flow through the glass bath and in particular avoids preferential current flow around the periphery of the furnace. The electrodes are placed side by side in pairs so that their tips form the points of a triply truncated triangle. They are connected in staggered fashion across the isolated secondary coils of a three-phase transformer.

Disclosure of the invention

This invention relates to electric glass furnaces and more particularly to a novel electrode and power supply assembly for obtaining a more uniform distribution of electric heating current through the glass in a glass furnace. The more even heating afforded by the electrode assembly and power supply connections of this invention results in a more uniform melting of the glass within the furnace, more efficient furnace operation and longer furnace life.

Electric heating has been used for many years in glass furnace operations, both alone and in combination with fuel fired heat sources. In electric heating systems, a plurality of electrodes are submerged in the glass bath and electrical current is passed between the electrodes through the material in the furnace and in so doing, heats and melts the glass. A wide variety of electrode configurations have been proposed and most often the electrodes pass through the side walls or bottom of the furnace so as to produce current flow through the bath which heats the glass by the so-called Joule effect.

One of the major difficulties encountered in an electrically heated glass furnace involves the establishment and maintenance of a uniform distribution of heating current through the glass as it is being processed in a furnace. This is due, at least in part, to the negative temperature coefficient of resistivity of glass. That is, as the glass becomes hotter its resistivity decreases rather than increases as is the case with the more customary electrical conductors. Current flow through the molten glass in the furnace has a cumulative effect such that as the area of the material through which the current passes increases in temperature due to the Joule effect heating of the current, the resistance of the material goes down, tending to further increase the current flow through the hotter portions of the glass bath. The result is a tendency to create so-called "hot spots" in the furnace which have a tendency to short out some of the current flow to cooler portions of the furnace. The result is a non-uniform heating and melting of the glass in the furnace and a decrease in the efficiency of furnace operation.

The problem is particularly aggravated in the larger furnaces in which the electrodes project through the side walls of the furnace in that short circuit currents tend to build up about the periphery of the glass bath in the furnace whereas the glass in the center of the furnace is not sufficiently heated by the submerged electrodes. This problem of peripheral heating or localized hot streaks in the bath material is substantially avoided in the present invention by the provision of a novel electrode spacing and orientation in conjunction with a power supply connection that optimizes current flow through the central area of the furnace and minimizes the localized heating and short circuit flow paths at the periphery of the furnace near the side walls evidenced by prior constructions.

This is brought about in part by providing a symmetrical arrangement of six electrodes, but in which the electrodes are moved close together in pairs so that their ends are generally at the points of a hexagon which has the appearance of a triply truncated triangle. At the same time, the electrodes are connected to the secondary of a three-phase transformer which secondary is connected in what might be called an open or isolated secondary configuration externally of the bath. The electrodes are connected to the transformer secondary such that the full phase voltage of one of the secondary windings does not appear between adjacent electrodes. This connection has been found to substantially improve the melting conditions in the furnace whereby the center part of the furnace melts about equally with the material near the furnace side walls. In other words, through the electrode assembly and power supply connections of this invention, the hot streaks have been found significantly reduced to the extent that they are substantially, if not completely, eliminated.

It is therefore one object of the present invention to provide an assembly for more uniformly applying electrical heat to a glass furnace.

It is another object of the present invention to provide a heating electrode assembly and power supply connection which minimizes, if not completely eliminates, localized current flow or electrical hot spots in the furnace, especially adjacent the furnace side walls.

Another object of the present invention is to provide an electrode assembly for electrical furnaces which acts to increase furnace efficiency and life by the avoidance of hot spots or hot streaks in the furnace particularly near the furnace walls.

Another object of the present involves the provision of electrodes in an electrical furnace arranged and connected to more uniformly heat the glass in the furnace. The electrodes are brought together in pairs with the individual electrodes of each pairs being closely spaced so that their innermost ends are generally at the points of a hexagon which has the appearance of a triply truncated triangle. In addition, the electrodes are connected to the secondary of a three-phase transformer, the secondary windings of the transformer being connected in an open configuration so that the entire phase voltage of one winding of the transformer secondary does not appear between adjacent electrodes.

These and further objects and advantages of the present invention will be more apparent upon reference to the folowing specification, claims and appended drawings wherein:

FIG. 1 shows a prior art electrical furnace construction of the continuous glass furnace type with the electrodes intended to be spaced and configured to produce uniform heating through the glass;

FIG. 2 is a similar view of a recent prior art construction where the electrodes are increased in number and again intended to be spaced to provide a more uniform distribution of Joule effect heating currents through the material in the furnace;

FIG. 3 is a similar horizontal cross section through a hexagonal furnace of the type illustrated in FIGS. 1 and 2 but shows the novel electrode spacing of the present invention wherein the inner ends of the electrodes are arranged in pairs and pass through alternate side walls of the furnace; and FIG. 4 is an electrical circuit diagram showing the novel three-phase transformer connection of the present invention from a three-phase source to the electrodes in the furnace of FIG. 3.

Referring to the drawings, FIG. 1 shows an electric furnace generally indicated at 10 having hexagonally shaped side walls 12 through alternate sections of which pass elongated electrodes 14, 16, and 18. FIG. 1 represents a horizontal cross section through a well known prior art type construction where the electrical furnace is of the continuous type and the three electrodes 14, 16, and 18 pass through the side walls of the furnace and penetrate the side walls below the glass level. Furnaces of this general type constitute well known prior art as shown for example in U.S. Pat. 1,905,534 to Wadman. The furnace is of the continuous type and conventionally includes a throat through which the melted glass passes from the furnace in the direction indicated by the arrow 20 in FIG. 1.

The offset and elongated nature of the electrodes 14, 16, and 18 in FIG. 1 is provided to enhance the flow of heating current through the central area 22 of the furnace. However, with the electrodes connected to a conventional three-phase power supply, it has been found that in the configuration of FIG. 1, there is a strong tendency for hot streaks to develop in the glass between the tip of electrode 14 and the base of electrode 16, i.e., between points 24 and 26 in FIG. 1. Similarly, hot streaks tend to form between the tip 28 of electrode 16 and the base 30 of electrode 18 and also between the tip 32 of electrode 18 and the base 34 of electrode 14. As a result of these peripheral hot streaks, the central portion of the furnace indicated at 22 does not melt out adequately. Accordingly, the areas around the periphery of the furnace become hotter than the glass in the center 22 and because of the decrease in resistance of the glass with increase in temperature, there is established in the furnace a preferred current path coincident with this hotter glass and lower resistance. This extra heat release between electrode hot spots perpetuates itself because the hotter it becomes, the better a current carrier it is with further heat release. When this hot streaking around the perimeter occurs, there is less efficient melting in the center and extra wear on the refractories forming the side walls of the furnace resulting in shorter furnace life. The long electrodes also suffer from excessive breakage.

FIG. 2 shows, in similar horizontal cross section, a more recent prior art construction which has been suggested in an attempt to obtain a more uniform current flow through the material in the glass furnace. In FIG. 2, the furnace, generally indicated at 40, is similarly of hexagonal cross section in the manner of furnace 10 of FIG. 1. Furnace 40 of FIG. 2 includes the side walls 42. Passing through each section of the side walls of the furnace is one of six horizontal electrodes 44, 46, 48, 50, 52, and 54. A furnace of this general type is disclosed by way of example only in U.S. Pat. 2,993,079 to Augsburger and differs from the furnace illustrated in FIG. 1 not only in the construction of the electrodes but also in the fact that the glass exits through a throat along the line 56 in FIG. 2. The central area of the furnace in FIG. 2 is indicated by the reference numeral 58. The electrodes in this embodiment are connected to a three-phase power supply by a phase splitting transformer to produce six phases, each phase being connected to a different one of the electrodes 44 through 54 in FIG. 2.

The arrangement illustrated in FIG. 2 avoids the breakage problem and is intended to accomplish uniformity of current flow, particularly through the center of the furnace. However, this last objective is not met due to local heating of the glass around each of the electrodes which sets up a preferential flow path around the furnace adjacent the sidewalls 42.

To illustrate, a conventional electrode having a diameter of approximately 1¼ inches and an immersion length of about 20 inches, has a surface layer of glass having an area of approximately 80 square inches through which all current must pass either into or out of the electrode. By contrast, in the middle of the furnace, the cross sectional area through which the electrical current is free to pass is in the order of tens of square feet. It is obvious that in the construction of FIG. 2, the voltage drop across the limited area and thus higher resistance near the electrodes is greater per unit length of path than in the center of the furnace.

This greater voltage drop near the electrodes results in an extra release of heat adjacent the electrodes which causes a further complication. In FIG. 2, when electrodes 44, 46, 48, 50, 52, and 54 are energized, the region of glass immediately adjacent the electrodes becomes hotter by about 100° F. This extra heat release shines outwardly in all directions. The effect on the bath is not symmetric, however, since the heat from electrode 48 shining in the direction of electrode 46 is met by heat from electrode 46 shining at electrode 48. Accordingly, the space between electrodes 46 and 48 is heated preferentially. The same effect is true between electrodes 48 and 54 but to a lesser degree because of the increased distance between electrodes. Accordingly, the ring of glass between the shaded areas 64, 66, 68, 70, 72 and 74 in FIG. 2 around the respective electrodes becomes hotter than the glass in the center 58 of the furnace and provides a preferred current path due to the lowered resistance. Again, this extra heat release in the ring between electrode hot spots perpetuates itself because the hotter the ring becomes the better a current carrier it is with further heat release. This effect is well known and is based on the negative temperature coefficient of resistivity of glass. Graphs giving data on this are shown in Chapter 12 of the "Handbook of Glass Manufacture," volume II. When this hot streaking around the perimeter occurs, there is extra wear on the refractory blocks lining the inside of the conventional glass furnace resulting in shorter furnace life.

The novel construction provided by the present invention is illustrated in FIGS. 3 and 4. FIG. 3 is again a horizontal cross section through a furnace generally indicated at 80, which furnace is similar to the furnaces of FIGS. 1 and 2 with the exception of electrode placement and the fact that the material of the furnace exits from the throat along the line illustrated at 82 in FIG. 3. The furnace is of hexagonal configuration and is comprised of a side wall 84 consisting of sections 86, 88, 90, 92, 94, and 96. In FIG. 3, the electrodes 98, 100, 102, 104, 106, and 108 are circular cross-sectioned electrodes similar to those illustrated in FIG. 2 and pass through alternate side walls of the furnace in FIG. 3 so as to be submerged in the glass within the furnace. Again, the individual electrodes are surrounded by a volume of glass of increased temperature as represented by the shading at 118, 120, 122, 124, 126, and 128. The central area of the furnace is illustrated by the reference numeral 110 in FIG. 3.

The electrode assembly illustrated in FIG. 3 differs from that of FIG. 2 primarily in that the electrodes are moved closer together in pairs so that their ends are generally at the points of a hexagon indicated by the dashed line at 112 which has the appearance of a triply truncated triangle. The hot spots 118, 120, 122, 124, 126, and 128 around the electrodes are not able to cooperate preferentially with the adjacent hot spots, particularly in view of the extra cooling space between them caused by the intermediate wall sections such as the wall section 86 between electrodes 108 and 98, the wall section 90 between electrodes 120 and 122 and the wall section 94 between adjacent electrodes 124 and 126. Under the circumstances illustrated in FIG. 3 with the avoidance of the hot conductive perimeter, the full phase voltage between electrodes such as electrodes 100 and 106 is able to deliver effective heat through the center 110 of the bath. Similarly, the full phase voltage between electrodes 102 and 108 and between electrodes 98 and 104 contribute full phase heating in turn according to the three-phase nature of the supply through the central portion 110 of the furnace.

FIG. 4 is a circuit diagram showing the manner of supplying electrical energy to the electrodes of FIG. 3. For the purposes of explanation, the electrodes in FIGS. 3 and 4 have been lettered A through F, corresponding electrodes being similarly lettered in each of FIGS. 3 and 4. Referring to FIG. 4, the electrodes are connected to a three-phase power source 130 through a three-phase transformer generally indicated at 132. Source 130 may be of any conventional construction and, for example, may comprise a conventional three-phase power supply line or power main connected to the respective terminals 134, 136, and 138 of the transformer primary 140 by way of leads indicated by dashed lines at 142, 144, and 146. Primary 140 comprises three coils connected in a closed delta configuration and having the common terminals 134, 136, and 138, which connect to the three different phases of source 130. The transformer secondary comprises three separate coils, 152, 154, and 156 connected in an open or isolated configuration. That is, opposite ends of the coil 152 are connected by leads 160 and 162 to respective electrodes 100 and 106. Similarly, secondary coil 154 is connected by leads 164 and 166 to electrodes 98 and 104 respectively. Finally, coil 156 has its opposite ends connected by leads 168 and 170 to electrodes 108 and 102 respectively. With the electrodes connected in the manner illustrated, the phasor diagram for the transformer has the form of a six-pointed asterisk with the vectors intersecting each other at their respective centers. It has been found that the furnace will not operate properly if the secondary coils are not isolated, that is, if electrodes in the same side wall such as electrodes A and B are electrically connected together externally of the furnace.

In one embodiment constructed in accordance with the present invention, the furnace has a side wall 84 formed of sections 86, 88, 90, 92, 94 and 96 all having a length of six feet. It was found that for a hexagonal furnace of this size, a spacing between electrode pairs, i.e., between electrodes such as A and B of from about 24 to about 36 inches gave good results. In general, the spacing between electrodes should be from about one-third to one-half the length of one side of the hexagonal wall. In the triply truncated triangles or irregular hexagon formed by the electrode tips, the short sides of the irregular hexagon may vary in length from about one-quarter to about two-thirds the length of the long sides. The immersion length of the electrodes of this embodiment was on the order of 18 to 26 inches. This may vary from as little as 8 inches to as much as 46 inches for different size furnaces. The electrodes were of molybdenum and constructed generally according to Penberthy Pat. 2,693,498. Alternatively, electrodes made of tin oxide may be employed if desired.

It should be noted that the voltage between electrodes A and F is not a full phase voltage, but instead is the phase voltage minus the voltage which appears between electrodes C and D. The net voltage between electrodes A and F is typically about 60% of the phase voltage. While transformer 132 is illustrated as having its primary winding connected in delta, the primary may, if desired, be connected in star.

It is apparent from the above that the present invention provides an improved construction as illustrated in FIGS. 3 and 4 which increases the uniformity of current flow and hence the uniformity of electrical heat throughout the area of the glass furnace and particularly applies heating current to the central area of the furnace. This is brought about in a relatively simplified and inexpensive construction and particularly avoids the preferential heat paths or heat streaks around the periphery of the furnace evidenced by known prior constructions. This not only improves the efficiency of operation to provide uniform melting of the glass within the furnace but also increases furnace life by reducing wear on the refractory blocks lining the furnace walls.

While the invention has been described in conjunction with a specific embodiment showing six horizontal electrodes immersed in a continuous glass furnace having a hexagonal cross sectional configuration, it is apparent that the invention is not so limited but may take a variety of forms and constructions. For example, in practicing the invention, it is not necessary to have the external shape of the furnace in the form of a hexagon and U.S. Pat. 2,993,079 shows in FIG. 3 an arrangement suitable for use with the present invention whereby the internal relationship herein described and disclosed is preserved in a furnace having another shape such as a rectangular or a square. In FIG. 3, the line of the throat is illustrated by the arrow 82, the throat itself being omitted for the sake of clarity and simplicity. It is understood that the throat may be of conventional construction such as that illustrated, for example, in FIG. 3 of U.S. Pat. 2,993,079. Alternatively, the device of the present invention may be used in conjunction with a glass outlet in the center of the bottom of the furnace if desired. Also, rather than being horizontal, the electrodes can be arranged vertically through the bottom of the furnace, with their centers spaced approximately according to the tips of the horizontal electrodes illustrated.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a glass furnace, an electrode assembly comprising at least six electrodes adapted to be submerged in the bath of said glass furnace, said electrodes being grouped in pairs about said furnace such that their tips form the points of a triply truncated triangle, the distance between the electrode tips of a pair of such electrodes being less than the distance between the tip of one of said pair of electrodes and the tip of the electrode nearest said one electrode of a next adjacent pair of electrodes, and means for coupling said electrodes to a three-phase power supply.

2. In a glass furnace, an electrode assembly comprising at least six electrodes adapted to be submerged in the bath of said furnace, said electrodes being arranged so that their tips are at the points of a hexagon having alternating longer and shorter sides and means for coupling said electrodes to a three-phase delta power supply which includes three secondary coils, said coils being electrically isolated from each other externally of the bath, one terminal of each secondary being connected to a different first electrode, and the other terminal of each secondary coil being connected to a different second electrode, said second electrode being the third removed from said first electrode for each coil, the electrodes which are nearest each other in pairs being connected to terminals which are at the same corner of the secondary delta.

3. Apparatus according to claim 1 wherein said coupling means comprises three transformer secondary windings which are electrically isolated from each other externally of the bath and whose respective voltage vectors have the relationship of normal three-phase power.

4. Apparatus according to claim 3 wherein said furnace has a hexagonally shaped side wall, said electrodes passing in pairs through said side wall.

5. Apparatus according to claim 3 wherein said electrodes are arranged in pairs in said hexagonal furnace, the spacing between the inner ends of a pair being from about one-third to about one-half of the side of the hexagon.

6. Apparatus according to claim 3 wherein said electrodes have their inner ends submerged beneath the glass bath of said glass furnace.

7. Apparatus according to claim 3 wherein the spacing between electrodes of each pair is from about one-quarter to about two-thirds the spacing between adjacent pairs.

8. Apparatus according to claim 6 wherein said coupling means includes three transformer secondary windings, the opposite ends of said windings being connected to different ones of said electrodes.

9. Apparatus according to claim 8 wherein one end of each winding is connected to a different first electrode, and the opposite end of each winding is connected to a different second electrode, said second electrode being the third removed from said first electrode for each winding.

10. Apparatus according to claim 9 wherein the ends of each secondary winding are electrically isolated from the ends of the other secondary windings externally of said furnace.

11. Apparatus according to claim 6 wherein each section of said furnace side wall has a length of approximately six feet, said electrodes being made of molybdenum and having a circular cross section, the spacing between electrodes of each pair being from about 24 to about 36 inches, said coupling means comprising a three-phase transformer connecting said electrodes to a three-phase power supply, said transformer having three output windings each connected across the furthest separated of said electrodes.

References Cited

UNITED STATES PATENTS

| 2,749,378 | 6/1956 | Penberthy | 13—6 |
| 2,993,079 | 7/1961 | Augsburger | 13—6 |

H. B. GILSON, Primary Examiner

U.S. Cl. X.R.

13—6